United States Patent
Au-Yeung et al.

(10) Patent No.: US 8,295,379 B2
(45) Date of Patent: Oct. 23, 2012

(54) SYSTEM AND METHOD FOR NON-UNIFORM BIT ALLOCATION IN THE QUANTIZATION OF CHANNEL STATE VECTORS

(75) Inventors: Chun Kin Au-Yeung, West Lafayette, IN (US); Shahab Sanayei, Richardson, TX (US)

(73) Assignee: FutureWei Technologies, Inc., Plano, TX (US)

( * ) Notice: Subject to any disclaimer, the term of this patent is extended or adjusted under 35 U.S.C. 154(b) by 475 days.

(21) Appl. No.: 12/633,418

(22) Filed: Dec. 8, 2009

(65) Prior Publication Data

US 2011/0134978 A1  Jun. 9, 2011

(51) Int. Cl.
 H04L 5/12  (2006.01)
 H04L 23/02  (2006.01)
(52) U.S. Cl. ........ 375/265; 375/262; 375/340; 375/341; 714/792
(58) Field of Classification Search .................. 375/262, 375/265, 316, 324, 340, 341; 714/792, 794, 714/796
See application file for complete search history.

(56) References Cited

U.S. PATENT DOCUMENTS

| | | | | |
|---|---|---|---|---|
| 6,850,573 | B1 * | 2/2005 | Noda ............................. | 375/262 |
| 7,010,052 | B2 * | 3/2006 | Dill et al. ...................... | 375/265 |
| 7,480,852 | B2 | 1/2009 | Hedayat et al. | |

FOREIGN PATENT DOCUMENTS

| | | |
|---|---|---|
| KR | 10-0287861 | 2/2001 |
| WO | WO 2007/094832 A2 | 8/2007 |

OTHER PUBLICATIONS

Au-Yeung, C.K., et al., "Insights Into Feedback and Feedback Signaling for Beamformer Design," Info. Theo. and App. Workshop, Feb. 28, 2009, 4 pages.
Au-Yeung, C.K., et al., "Trellis Coded Beamforming Vector Quantization with Fractional Bits Per Antenna," IEEE, 2009, pp. 508-512.
International Search Report and the Written Opinion of the International Searching Authority, Applicant: Huawei Technologies Co., LTD., International Application No. PCT/CN2010/079526, Mar. 17, 2011, 12 pages.

* cited by examiner

*Primary Examiner* — Ted Wang
(74) *Attorney, Agent, or Firm* — Slater & Matsil, L.L.P.

(57) ABSTRACT

A system and method for non-uniform bit allocation in the quantization of channel state vectors is provided. A method for communications node operation includes receiving a bit-allocation profile for use in quantizing channel state information, measuring a communications channel between the communications node and a controller, generating channel state information based on the measurement, computing a bit representation of the channel state information, transmitting the bit representation to the controller, and receiving a transmission from the controller. The computing makes use of quasi-tail-biting trellis decoding, and the computing is based on the bit-allocation policy. The transmission makes use of the channel state information transmitted by the communications node.

20 Claims, 8 Drawing Sheets

SYSTEM AND METHOD FOR NON-UNIFORM BIT ALLOCATION IN THE QUANTIZATION OF CHANNEL STATE VECTORS

TECHNICAL FIELD

The present invention relates generally to wireless communications, and more particularly to a system and method for non-uniform bit allocation in the quantization of channel state vectors.

BACKGROUND

Generally, in a multiple input, multiple output (MIMO) wireless communications system, it is beneficial for a transmitter to have some knowledge of channel state information of a communications channel between itself and a receiver. One form of channel state information, as implemented in technical standards such as the Third Generation Partnership Project (3GPP) Long Term Evolution (LTE), is a combination of a precoding matrix index (PMI), a channel quality index (CQI) and a rank indicator (RI).

Typically, channel state information may be provided in the form of feedback from the receiver. However, due to overall bandwidth utilization issues, a feedback channel usually has limited bandwidth as well as a low reliable transmission rate. Therefore, the channel state information may need to be quantized or otherwise reduced in size prior to being feedback. Predefined codebooks containing codewords at both the transmitter and the receiver is a commonly used technique to reduce feedback channel overhead by allowing the receiver to feedback an index to a codeword in the codebook rather than the codeword itself.

In multi-cell downlink transmissions, multiple base stations may simultaneously transmit to a single mobile station. In this situation, an effective number of transmit antennas may easily exceed four, which is usually the number of transmit antennas used in the design of codebooks in many technical standards. Furthermore, there is no standardized method for quantizing the PMI for a large number of transmit antennas.

Some of the technical standards also allow the use of relay nodes (RN). These technical standards may allow the RN and a base station to simultaneously transmit to a receiver. The receiver may need to quantize a joint communications channel (a communications channel between the RN and itself and a communications channel between the base station and itself), which may also exceed four transmit antennas.

Furthermore, transmissions from different transmission points may experience different losses, such as path loss, fading, shadowing, and so forth, which may mean that transmissions originally transmitted at substantially the same power level may arrive at their destinations at different energy levels. For example, a transmission from a distant transmission point may arrive at a destination at a lower energy level than a transmission made from a near transmission point. Therefore, different components of beamforming vectors may have different energies.

SUMMARY OF THE INVENTION

These and other problems are generally solved or circumvented, and technical advantages are generally achieved, by embodiments of a system and method for non-uniform bit allocation in the quantization of channel state vectors.

In accordance with an embodiment, a method for communications node operation is provided. The method includes receiving a bit-allocation profile for use in quantizing channel state information, measuring a communications channel between the communications node and a controller, generating channel state information based on the measurement, computing a bit representation of the channel state information, transmitting the bit representation to the controller, and receiving a transmission from the controller. The computing makes use of quasi-tail-biting trellis decoding, and the computing is based on the bit-allocation policy. The transmission makes use of the channel state information transmitted by the communications node.

In accordance with another embodiment, a method for communications node operation is provided. The communications node is served by a plurality of controllers. The method includes receiving a bit-allocation profile for use in quantizing channel state information, measuring a joint communications channel between the communications node and each controller in the plurality of controllers, generating channel state information based on the measurement, computing a bit representation of the channel state information, transmitting the bit representation to each controller in the plurality of controllers, and receiving a transmission from each controller in the plurality of controllers. The computing makes use of quasi-tail-biting trellis decoding, and the computing is based on the bit-allocation policy. The transmission makes use of channel state information transmitted by the communications node.

In accordance with another embodiment, a method for controller operation is provided. The method includes determining a bit-allocation policy, sending the bit-allocation policy to the communications node, receiving feedback information from a communications node, reconstructing channel state information from the feedback information, adjusting a transmitter of the controller based on the reconstructed channel state information, and transmitting information to the communications node using the adjusted transmitter. The reconstructing makes use of quasi-tail-biting trellis encoding, and the reconstructing is based on the bit-allocation policy.

An advantage of an embodiment is that a number of bits allocated for the quantization of channel state vectors may be non-uniformly allocated to different transmission sources, thereby potentially giving additional channel state information resolution to low loss situations and reducing channel state information resolution to high loss situations. The different channel state information resolutions may allow for greater degrees of control in beamforming in situations that may more effectively make use of the additional resolution.

Another advantage of an embodiment is that a trellis structure with a constant number of states per stage is presented along with a technique for generating the trellis structure. The ability to provide different resolutions for different portions of the channel state information typically requires the use of a trellis structure with differing number of states per stage when quantizing the channel state information, which may be complex to implement. A constant number of states per stage may simplify trellis decoding and encoding.

A further advantage of an embodiment is that an efficient system and method for the quantization of channel state vectors for situations with a large number of transmit antennas is provided. The efficient quantization of channel state vectors reduces a computational requirement on receivers, thereby allowing the use of less powerful, less expensive, and lower power consuming processors in receivers. The less expensive and lower power consumption processors may reduce the cost of the receivers while extending their battery life.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a MIMO wireless communications system adherent to the 3GPP LTE technical standards. The invention may also be applied, however, to other wireless communications systems MIMO wireless communications system, such as LTE-Advanced compliant systems, as well as wireless communications systems that allow MIMO operations with a large number of transmit antennas and/or cooperative (or joint) MIMO operation with multiple base stations and/or relay nodes.

Figure 1:
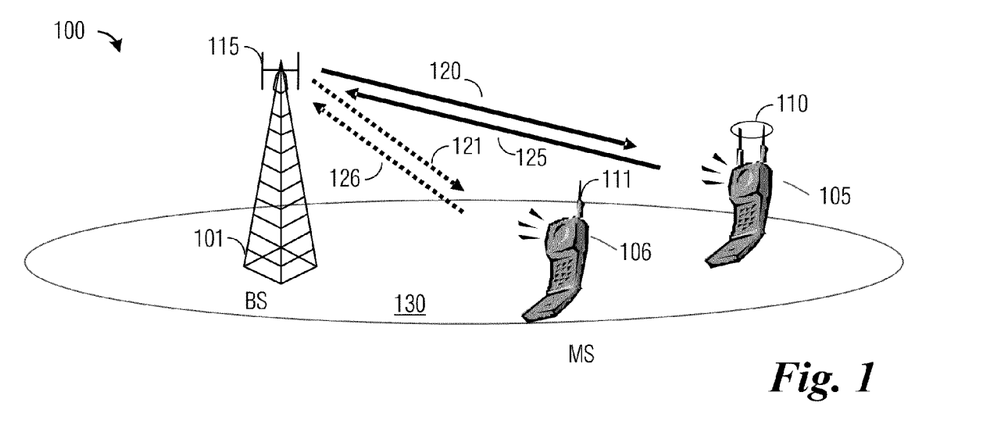
FIG. 1 is a diagram of a wireless communications system.

FIG. 1 illustrates a wireless communications system 100. Wireless communications system 100 includes a base station (BS) 101 and a plurality of mobile stations (MS), such as MS 105 and MS 106, which may be mobile or fixed. BS 101 and MS 105 and MS 106 communicate using wireless communication. BS 101 has a plurality of transmit antennas 115 while MS 105 and MS 106 may have one or more receive antennas 110 and 111. BS 101 sends control and data to MS 105 through a downlink (DL) channel 120 while MS 105 sends control and data to BS 101 through uplink (UL) channel 125. Similarly, BS 101 sends control and data to MS 106 through DL channel 121 and MS 106 sends control and data to BS 101 through UL channel 126.

MS 105 may send control information on UL channel 125 to improve the quality of the transmission on DL channel 120. BS 101 may send control information on DL channel 120 for the purpose of improving the quality of UL channel 125. A cell 130 is a conventional term for the coverage area of BS 101. It is generally understood that in wireless communications system 100 there may be multiple cells corresponding to multiple BSs.

Figure 2A:
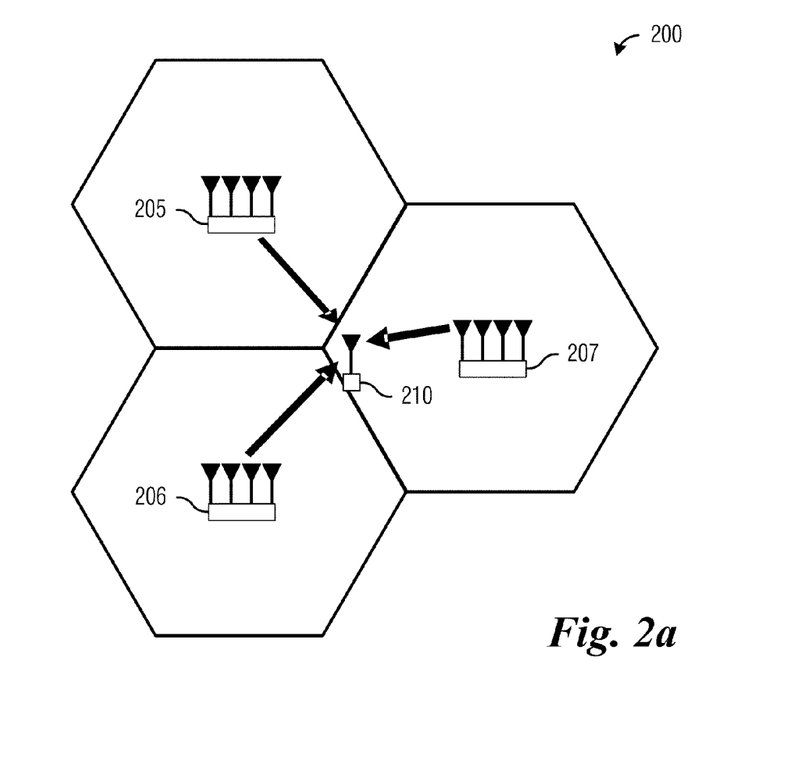
FIG. 2a is a diagram of a wireless communications system with cooperative MIMO operation with multiple base stations.

FIG. 2a illustrates a wireless communications system 200 with cooperative MIMO operation with multiple base stations. Wireless communications system 200 includes multiple base stations, such as BS 205, BS 206, and BS 207, operating in cooperative MIMO operation to transmit to a MS 210. A joint communications channel between the multiple base stations and MS 210 readily exceeds four transmit antennas when each of the multiple base stations has more than two transmit antennas.

Figure 2B:
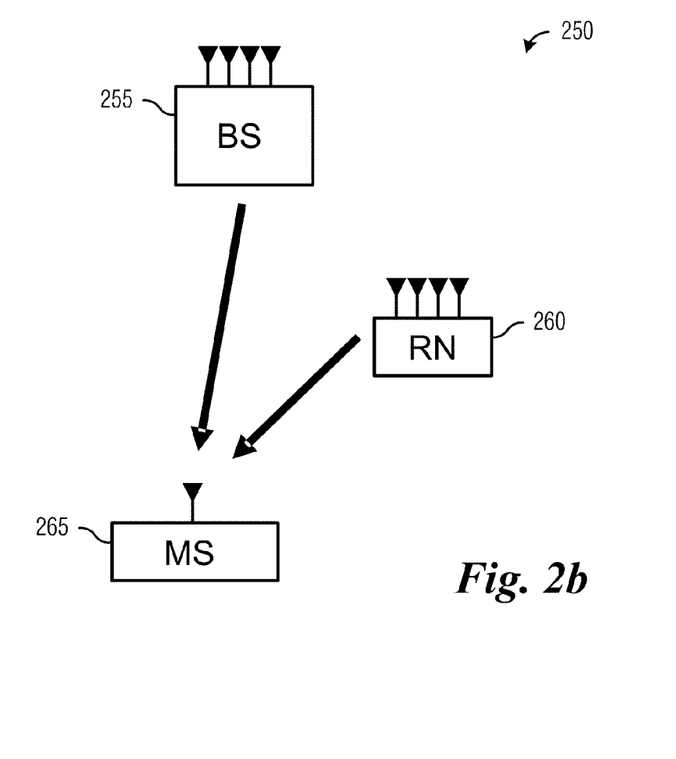
FIG. 2b is a diagram of a wireless communications system with cooperative MIMO operation with base stations and relay nodes.

FIG. 2b illustrates a wireless communications system 250 with cooperative MIMO operation with base stations and relay nodes. Wireless communications system 250 includes BS 255 and RN 260 operating in cooperative MIMO operation to transmit to a MS 265. A joint communications channel between BS 255 and RN 260 and MS 265 readily exceeds four transmit antennas when BS 255 and RN 260 has more than two transmit antennas each.

Figure 2C:
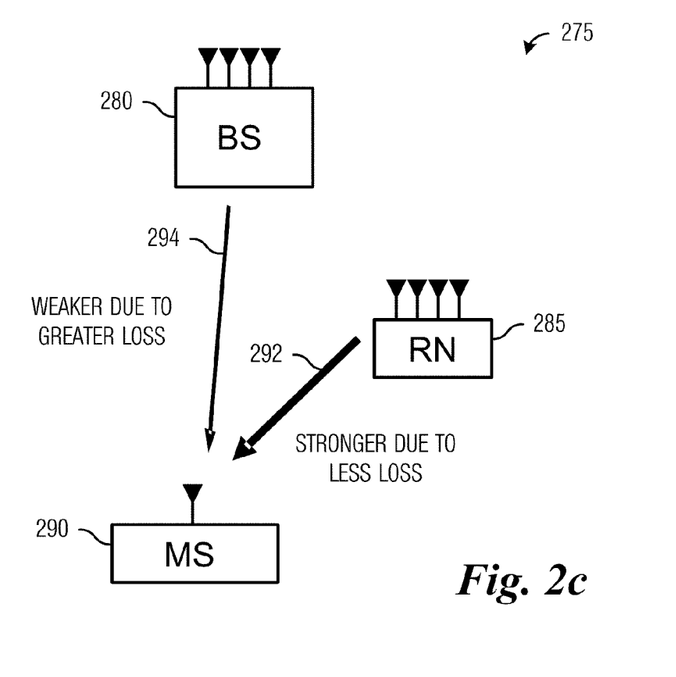
FIG. 2c is a diagram of a wireless communications system with different loss on different channels.

FIG. 2c illustrates a wireless communications system 275 with cooperative MIMO operation with base stations and relay nodes. Wireless communications system 275 includes BS 280 and RN 285 operating in cooperative MIMO operation to transmit to a MS 290. RN 285 may be in closer proximity to MS 290 than BS 280 or there may be an unobstructed transmission path between RN 285 and MS 290, therefore, a channel 292 between RN 285 and MS 290 may experience less loss (e.g., path loss, fading, shadowing, and so forth) than a channel 294 between BS 280 and MS 290. Since it experiences less loss, transmissions from RN 285 may be stronger when they arrive at MS 290 than transmissions from BS 280.

Due to greater received power level of transmissions from RN 285 when compared to transmissions from BS 280, precoding and beamforming may have a greater impact on the quality and/or amount of data that may be transmitted by RN 285. Additional resolution available in channel state information regarding channel 292 from RN 285 may lead to better overall performance. While, additional resolution available in channel state information regarding channel 294 from BS 280 may not significantly impact overall performance.

Generally, however, there may be a fixed amount of resolution that may be available for feeding back channel state information. Therefore, it may not be possible to provide additional resolution for feeding back channel state information from one transmission source without impacting (i.e., reducing) resolution for feedback channel state information for another transmission source, which may negatively impact overall performance.

However, for communications channels with high loss, such as channel 294, a decrease in resolution for feeding back channel state information may not significantly impact the overall performance due to the low quality of the channel. In such a situation, it may be possible to reallocate some of the resolution for feeding back channel state information for a high loss channel to a low loss channel.

In order to maintain quantization accuracy, a size of a codebook used to quantize channel state information should grow according to:

$$\log_2 N = B(M-1),$$

where M is the number of transmit antennas (dimension), B is the number of available quantization bits per antenna, and N is the number of codewords in the quantization codebook. In typical wireless communications systems, M is small (usually two to four), B is small (normally, one to two). Therefore, N is also small and may be exhaustively searched. Given a quantization accuracy B, N is exponential in M. Hence, for a large antenna system, exhaustive search through a codebook of N codewords may be prohibitively complex.

In general, an exhaustive search to quantize channel state information for a wireless communications system with dimension M, B bits per dimension, and codebook of size $N=2^{BM}$, may involve a comparison of a chordal distance of a normalized channel state information vector with each of the N codewords in the codebook (expressed as w=arg max$_f$|h*f|, where w is the quantized channel state information vector, h is the channel vector, and f is a codeword from the codebook) and a codeword that is closest to the normalized channel state information vector may be reported. Therefore, exhaustive search may have a quantization complexity of $O(M2^{BM})$, where $O(.)$ indicates an order, and is exponential in M.

A method to reduce quantization complexity known as reduced exhaustive search for a wireless communications system with dimension M, divides the M dimensions into chunks with each chunk having dimension L (there are M/L chunks). Wireless communications system also has parameters of B quantization bits per dimension, and codebook of size $N=2^{BL}$. Each of the M/L chunks may then be exhaustively searched as described above and the results combined. Therefore, reduced exhaustive search may have a quantization complexity of $O(M2^{BL})$ and is linear in M.

Figure 3A:
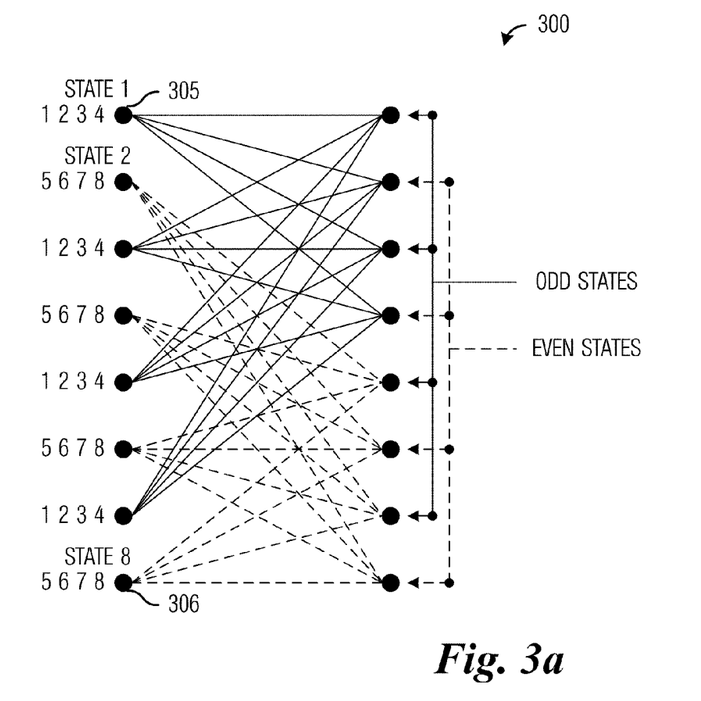
FIG. 3a is a diagram of an Ungerboeck trellis.

FIG. 3a illustrates an Ungerboeck trellis 300. As shown in FIG. 3a, Ungerboeck trellis 300 has eight states (numbered from state one 305 to state eight 306). Numbers shown in front of a state, such as "1 2 3 4" in front of state one 305, may represent an output produced by Ungerboeck trellis 300 as input is provided to Ungerboeck trellis 300. A relationship between input and output may depend on an application of Ungerboeck trellis 300.

In general, each state of an Ungerboeck trellis has $2^b$ exiting branches and $2^b$ entering branches. Therefore, every stage in an Ungerboeck trellis represents b bits. There may be $2^{b+1}$ states per stage of an Ungerboeck trellis. As shown in FIG. 3, Ungerboeck trellis 300 represents b=two bits.

Additionally, in an Ungerboeck trellis, odd numbered states (e.g., states one, three, five, and seven in Ungerboeck trellis 300) may only transition to a first half of all possible states (e.g., states one, two, three, and four in Ungerboeck trellis 300). Similarly, even numbered states (e.g., states two, four, six, and eight in Ungerboeck trellis 300) may only transition to a second half of all possible states (e.g., states five, six, seven, and eight in Ungerboeck trellis 300).

Figure 3B:
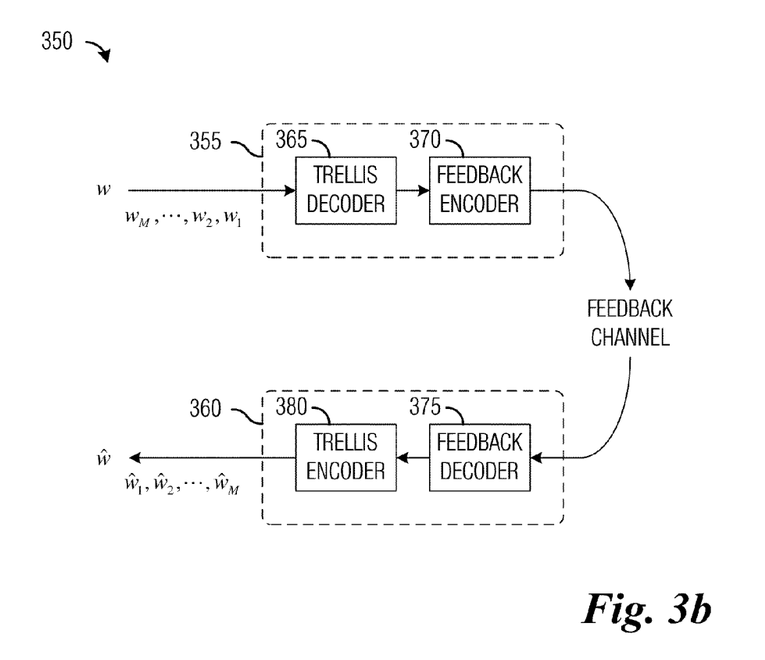
FIG. 3b is a diagram of a system for channel state information feedback using entry-by-entry trellis encoding and decoding.

FIG. 3b illustrates a system 350 for channel state information feedback using entry-by-entry trellis encoding and decoding. System 350 includes a feedback information generator 355 at a receiver (i.e., transmitter of feedback information) for converting channel state information ($w=(w_M, \ldots, w_2, w_1)$) into feedback information to be transmitted to a transmitter (i.e., receiver of feedback information) over a feedback channel. At the transmitter, system 350 includes a feedback information decoder 360 for converting the feedback information into a received version of the channel state information ($\hat{w}=(\hat{w}_1, \hat{w}_2, \ldots, \hat{w}_M)$).

Feedback information generator 355 includes a trellis decoder 365 that may be used to convert the channel state information ($w=(w_M, \ldots, w_2, w_1)$) into a quantized bit representation thereof. Entry-by-entry trellis decoding takes one entry as trellis input at a time, such as $w_1$, followed sequentially by entries $w_2$, $w_3$, and so on. Trellis decoding may be accomplished using techniques such as the iterative Viterbi algorithm wherein the Viterbi algorithm is executed several times until a solution is found or a maximum permitted number of times the Viterbi algorithm is executed is reached or a suboptimal algorithm that executes the Viterbi algorithm just twice wherein a first execution forms estimates and a second execution uses the estimates to find the solution.

A feedback encoder 370 may then be used to encode the quantized bit representation of the channel state information with any suitable channel coding technique, including uncoded modulations.

Feedback information decoder 360 includes a feedback decoder 375 to decode the received feedback information to produce a received version of the quantized bit representation of the channel state information due to interactions with the feedback channel, and a trellis encoder 380 to convert the received version of the quantized bit representation of the channel state information to a received version of the channel state information ($\hat{w}=(\hat{w}_1, \hat{w}_2, \ldots, \hat{w}_M)$), wherein the received version of the channel state information may differ from the channel state information due interactions with the feedback channel. Entry-by-entry trellis encoding encodes a single entry at a time, such as $\hat{w}_1$ may be first encoded, followed sequentially by entries $\hat{w}_2$, $\hat{w}_3$, and so on. Trellis encoding may be accomplished by executing a trellis encoding algorithm twice wherein a first execution finds a proper starting state using reference information and a second execution uses the proper starting state to actually encode the trellis.

Requirements for entry-by-entry trellis decoding and encoding may include an integer number of bits per antenna (B) and an equal energy distribution per dimension. An extension to entry-by-entry trellis decoding and encoding exists wherein multiple entries are provided to the trellis instead of single entries.

As an example, trellis decoder 365 and trellis encoder 380 may utilize an Ungerboeck trellis, such as Ungerboeck trellis 300 of FIG. 3a, with B=two (2) bits per antenna, and an eight-PSK alphabet. A metric used to quantize the channel state information may be a chordal distance between a partial vector $\vec{w}$ and a partial output vector. The entry-by-entry trellis quantization may have a computational complexity of $O(M2^{2B})$, where M is dimension of wireless communications system.

Since system 350 utilizes a trellis having the same number of states per stage, a number of dimensions processed per stage and a number of bits of information allocatable per dimension remain constant throughout the trellis. What is needed is a system and method for non-uniform bit allocation in the quantization of channel state vectors.

Let a M-dimensional unit-norm complex vector (the channel state information vector) to be quantized be expressible as $\vec{w}=[w_1, \ldots, w_M]$, and U be the number of power groups, with power group u, where $u=1, \ldots, U$, having $M_u$ dimensions and $M_1 + \ldots + M_U = M$. Although the term power group intends to separate dimensions with different power values, the embodiments are not restricted to power level classifications. For example, two different power groups may have equal power levels. Furthermore, let $L_u$ be a number of dimensions to process in a single trellis stage for power group u, where $M_u$ is divisible by $L_u$ and $L_u$ is smaller than or equal to $M_u$.

Let B be a number of bits per dimension available to quantize the vector $\vec{w}$, yielding a total of $2^{BM}$ distinct quantization vectors. Let $B_u$ be a number of bits per dimension reserved for quantizing the dimensions in power group u and $B_1 L_1 + \ldots + B_U L_U = BM$. The quantity $B_u L_u$ must be an integer value for $u=1, \ldots, U$. If $B_1 = \ldots = B_U$, then the allocation of quantization bits is uniform, as in system 300 shown above.

Each power group may use a different codebook $F_u = [\vec{f}_1, \ldots, \vec{f}_{N(u)}]$, where $u=1, \ldots, U$ and $N(u) = G2^{B_u L_u}$, where N(u) is the number of codewords in codebook $F_u$, G is a parameter indicating a number of times a cardinality of codebook $F_u$ ($|F_u|$) is larger than $2^{B_u L_u}$, and may be designed a priori and known at both transmitter (BS and/or RN) and receiver (MS). A minimum value of G may be two and $2^{B_u L_u}$ has to be divisible by G for all values of u.

In a given power group u, $L_u$ of the $M_u$ dimensions of the vector $\vec{w}$ may be processed for each trellis stage, requiring $M_u/L_u$ trellis stages. In general, a trellis for power group u has $G2^{B_u L_u}$ states, with each representing one vector in codebook $F_u$. A single stage of a trellis for parameters $B_u=1$, $L_u=2$, and G=2 (resulting in eight vectors in codebook $F_u$) is shown in FIG. 3a.

Unlike in uniform bit quantization, $B_u$ may have different values for different values of u. Similarly, $B_u L_u$ may be different, which results in a different number of trellis states for different values of u.

The number of bits available for quantizing the vector $\vec{w}$ for each power group u, $B_u L_u$, may be determined in a variety of ways, typically depending on the application. For example, with multi-BS cooperative transmission, a long term average received power received at the MS may be different for each of the BS. By judicially shifting some of the quantization bits from lower power level dimensions to higher power dimensions, it may be possible to achieve higher quantization accuracy.

Therefore, it may be possible to define a bit-allocation policy dependent on received power levels. The bit-allocation policy may be known at both the MS and the multiple BSs. Since long term average power does not change rapidly, the long term average power values may be fed back to the multiple BSs or the bit-allocation policy may be updated separately in a low rate feedback channel.

Additionally, in a BS/RN cooperative transmission setting, it may be possible for the MS to receive stronger transmissions from the RN than from the BS. In this setting, a bit-allocation policy based on a ratio of long term average power from the RN and the BS may be used.

In situations where a time-domain orthogonal frequency division multiplexed (OFDM) channel is being quantized, a power-delay profile may be equivalent to a long term average power. Since the power-delay profile does not change rapidly, the MS may update the BS/RN using a low rate feedback or a low rate feedback channel. Furthermore, since signals with low delays usually have high power, quantization accuracy may be improved by using a suitably configured bit-allocation policy.

The bit-allocation policy may be determined based on feedback information provided by the MS. Alternatively, the bit-allocation policy may make use of position information using positioning measurements provided in many modern wireless communications systems.

The bit-allocation policy may be updated periodically at pre-determined times. Alternatively, the bit-allocation policy may occur upon an occurrence of an event, such as when a data rate falls below a threshold, an error rate (such as bit-error rate, frame-error rate, packet-error rate, or so forth) exceeds a threshold, a quality of service restriction is no longer being met, or so forth. Upon detection of an occurrence of an event, such as those listed above, the BS/RN may trigger an update by transmitting a request for feedback information from the MS. Upon receipt of the feedback information, the BS/RN may update the bit-allocation policy and then distribute the updated bit-allocation policy (or an indication thereof) to the MS.

Figure 4:
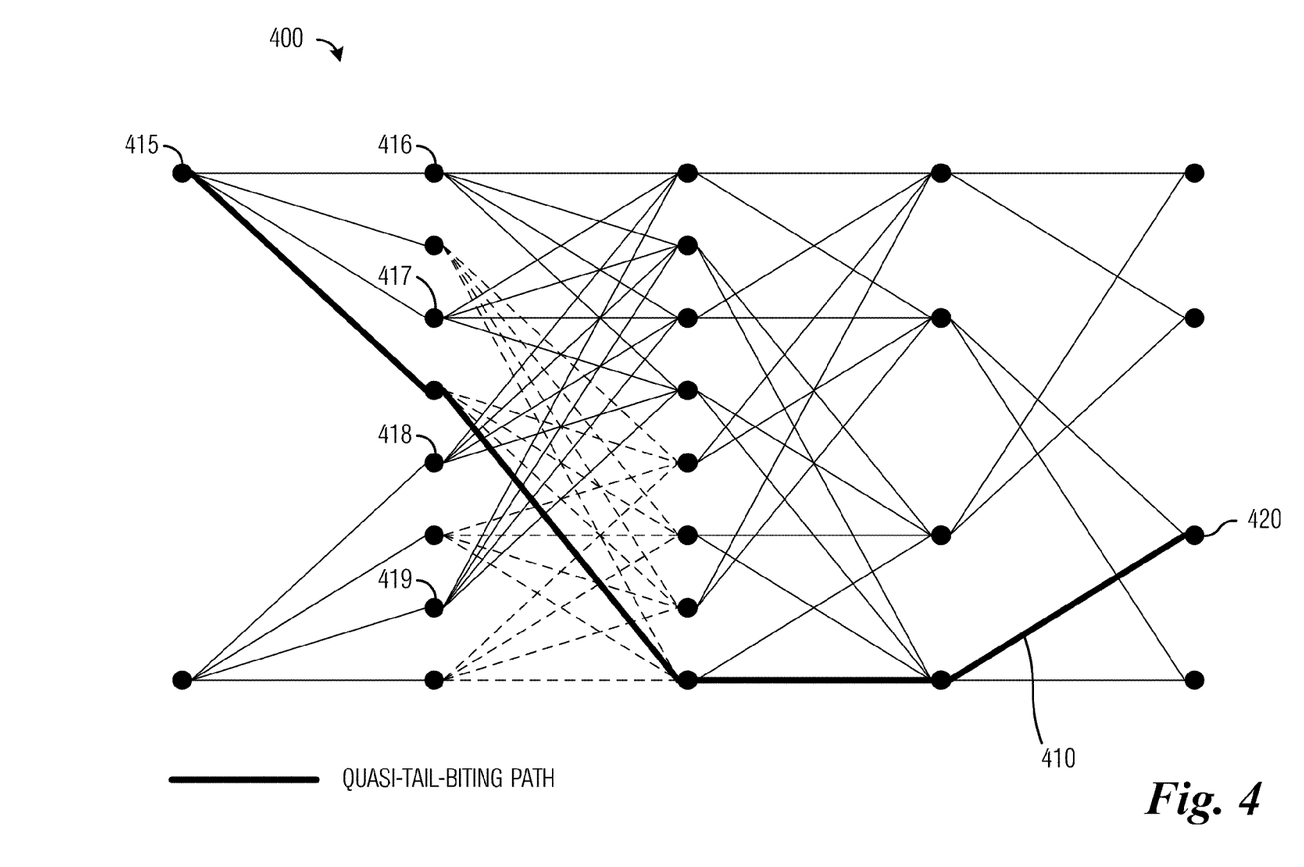
FIG. 4 is a diagram of a multi-stage trellis with a different number of states per stage.

FIG. 4 illustrates a multi-stage trellis 400, wherein there are a different number of states per stage. Multi-stage trellis 400 may be a trellis with parameters G=2, $B_1 L_1$=2, $B_2 L_2$=1, $M_1/L_1 = M_2/L_2$=2. A power group may include one or more states. For example, in a first stage, a power group may include state 415. Table 1 displays outputs of trellis branches of multi-stage trellis 400.

TABLE 1

| | Output of Trellis Branches | | | | | | | |
|---|---|---|---|---|---|---|---|---|
| Stage\State | 1 | 2 | 3 | 4 | 5 | 6 | 7 | 8 |
| 1 | 1 2 3 4 | 5 6 7 8 | 1 2 3 4 | 5 6 7 8 | 1 2 3 4 | 5 6 7 8 | 1 2 3 4 | 5 6 7 8 |
| 2 | 1 2 3 4 | 5 6 7 8 | 1 2 3 4 | 5 6 7 8 | 1 2 3 4 | 5 6 7 8 | 1 2 3 4 | 5 6 7 8 |
| 3 | 1 2 | 3 4 | 1 2 | 3 4 | 1 2 | 3 4 | 1 2 | 3 4 |
| 4 | 1 2 | 3 4 | 1 2 | 3 4 | | | | |

A tail-biting trellis may be defined as a trellis where only tail-biting paths are permitted. A tail-biting path may be defined as a path that is required to have the same beginning state and ending state. However, in a multi-stage trellis like multi-stage trellis 400 where the number of states per stage may differ, the definition of a tail-biting path may not hold.

A quasi-tail-biting trellis may then be defined as a trellis where only quasi-tail-biting paths are permitted. A quasi-tail-biting path may be defined as a path with a starting state and an ending state that are members of the same power group or if the states within a stage are numbered sequentially, the starting state and the ending state have the same remainder when divided by G. As shown in FIG. 4, path 410 starting at state 415 and ending at state 420 may be a quasi-tail-biting path since both state 415 and state 420 belong to the same power group.

A trellis with a non-constant number of states may be complex to implement. It may be more desirable to implement a trellis with a constant number of states at every stage. It may be possible to implement a trellis with $G^2$ states at every stage to cover possible combinations of B and L.

Figure 5:
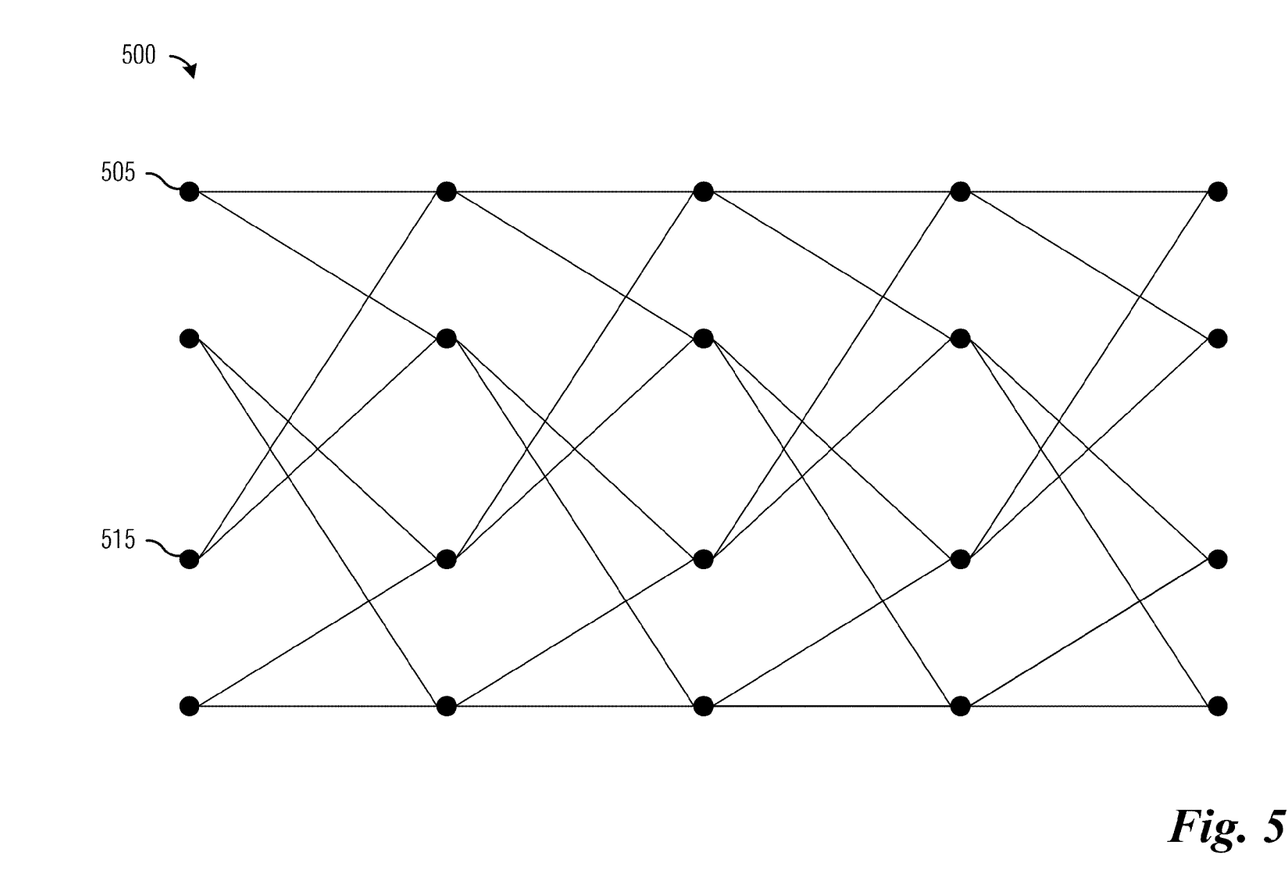
FIG. 5 is a diagram of a multi-stage constant state trellis with G=2.

FIG. 5 illustrates a multi-stage constant state trellis 500 with G=2. With G=2, each stage of multi-stage constant state trellis 500 has four ($2^2$) states per stage. States in a stage are shown as black filled circles, such as state 505. As shown in FIG. 5, multi-stage constant state trellis 500 corresponds to a trellis with parameters G=2, $B_1L_1$=2, $B_2L_2$=1, $M_1/L_1$=$M_2/L_2$=2, the same as multi-stage trellis 400.

Some of the states in multi-stage constant state trellis 500 are not present in multi-stage trellis 400, such as state 515. State 515 is a duplicate of state 505, which corresponds to state 415 of multi-stage trellis 400. Also, some of the states that are present in multi-stage trellis 400 are not present in multi-stage constant state trellis 500. For example, half of the states in stage two and stage three of multi-stage trellis 400 are not present in multi-stage constant state trellis 500 since they have been coalesced into states of the same power group. For example, assuming that states in a stage are numbered sequentially, then states one and three of multi-stage trellis 400 are coalesced into a single state, as well as states two and four, five and seven, and six and eight.

In general, to determine how states are coalesced, if a total number of states is $G2^{B_uL_u}$, a desired number of states is $G^2$, then every $2^{B_uL_u}/G$ states may be coalesced into a single state (recall that $2^{B_uL_u}$ is divisible by G). Then, separate all the states into groups of $2^{B_uL_u}$ states (states 1 to $2^{B_uL_u}$, $2^{B_uL_u}$+1 to $2^{B_uL_u+1}$, and so on). Within these groups, it may be possible to coalesce all states having the same remainder when divided by G into a single state. For example, with G=2, $B_uL_u$=2, there are a total of eight states that may be grouped into two groups of $2^{B_uL_u}$ states: states 1, 2, 3, 4; and states 5, 6, 7, 8. Then within group of states 1, 2, 3, 4, for example, 1 modulo G=3 modulo G and 2 modulo G=4 modulo G, hence states 1 and 3 are coalesced into a single state and states 2 and 4 are coalesced into a single state, and so forth.

Figure 6A:
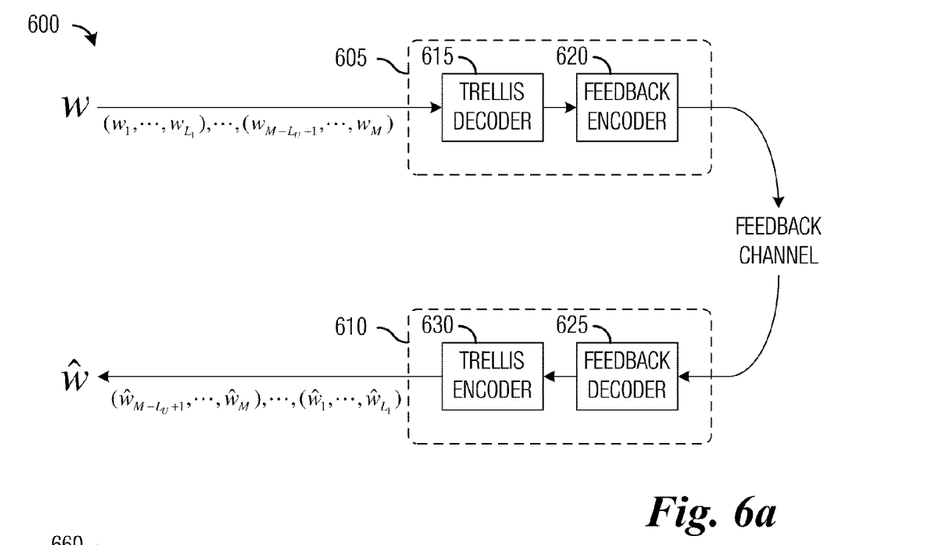
FIG. 6a is a diagram of a system for channel state information feedback using quasi-tail-biting trellis decoding and encoding with non-uniform bit allocation of quantization bits.

FIG. 6 illustrates a system 600 for channel state information feedback using quasi-tail-biting trellis decoding and encoding with non-uniform bit allocation of quantization bits. Instead of decoding/encoding a single entry at a time, $L_u$ dimensions of a length M channel state information vector $\vec{w}$ may be simultaneously inputted to the trellis decoder. $M_u$ is divisible by $L_u$, and $L_u$ is strictly smaller than M. Therefore, the quasi-tail-biting trellis has $M_u/L_u$ trellis stages for the power group u. Any fractional number of bits per dimension ($B_u$) may be used, as long as $B_uL_u$ is an integer value. Furthermore, equal energy per dimension is no longer a requirement. For quasi-tail-biting trellis decoding and encoding that operates on $L_u$ entries at a time using $B_uL_u$ bits, a quasi-tail-biting trellis with $G2^{B_uL_u}$ states per stage per power group u may be used.

A codebook $F_u=[\vec{f}_1, \ldots, \vec{f}_N]$ with $N=G2^{B_uL_u}$ vectors (codewords) may be designed and known at both the transmitter and the receiver. Each codeword in the codebook has dimension $L_u$ and G is a parameter indicating a number of times that the cardinality of codebook $F_u$, $|F_u|$, is greater than $2^{B_uL_u}$. The minimum value of G is two and $2^{B_uL_u}$ has to be divisible by G.

In general, a codebook $F_u$ for quasi-tail-biting trellis decoding and encoding for power group u, where u=1, ..., U, expressible as $$F_u = \{f_1, \ldots, f_{G2^{B_uL_u}}\},$$

may be generated by creating a codebook C with 1/G of a total number of entries:

$$C = \{c_1, \ldots, c_{2^{B_uL_u}}\},$$

with $2^{B_uL_u}$ vectors and then use G−1 unitary rotation matrices, $P_1, P_2, \ldots, P_{G-1}$, of dimension M×M to generate the other entries of the codebook: $F_u=\{C, P_1C, P_2C, \ldots, P_{G-1}C\}$. The codebook C may be generated by using a Grassmannian codebook that maximizes a minimum chordal distance among the distinct codebook vectors, using a structured codebook like a discrete Fourier transform codebook, a codebook from a technical standard, or so forth. The unitary rotation matrices may be found using a variety of techniques, including Monte Carlo simulation to perform QR decomposition (also known as QR factorization) on a randomly generated Gaussian matrix and then using the Q matrix as the unitary rotation matrix to maximize a minimum chordal distance between two distinct vectors in $F_u$.

System 600 includes a feedback information generator 605 at a receiver for converting channel state information (w=($w_1, \ldots, w_L), \ldots, (w_{M-L_U+1}, \ldots, w_M)$) where $L_u$ entries are fed into the trellis decoder at a time. At the transmitter, system 600 includes a feedback information decoder 610 for converting the feedback information into a received version of the channel state information ($\hat{w}=(\hat{w}_{M-L_U+1}, \ldots, \hat{w}_M), \ldots, (\hat{w}_1, \ldots, \hat{w}_{L_1})$). The ordering of the entries in the received version of the channel state information may be in a reversed order of the entries in the channel state information.

Feedback information generator 605 includes a trellis decoder 615 that may be used to convert the channel state information (w=[$w_M, \ldots, w_2, w_1$]) into a quantized bit representation thereof. Quasi-tail-biting trellis decoding takes $L_u$ entries at a time as input, such as ($w_1, \ldots, w_{L_1}$), followed sequentially by a second group of $L_u$ entries, such as ($w_{L_1i+1}, \ldots, w_{L_1+L_2}$), and so on, for power group u, where u=1, ..., U. Trellis decoder 615 makes use of a quasi-tail-biting trellis known at both the receiver and the transmitter. At each quasi-tail-biting trellis stage, $L_u$ dimensions (entries) of the channel state information (input to the quasi-tail-biting trellis) are decoded to output a $B_uL_u$-bit representation of a path through the quasi-tail-biting trellis stage.

If the quasi-tail-biting trellis decoder/encoder operates on $L_u$ dimensions at a time using $B_uL_u$ bits ($B_uL_u$ is an integer value), then an Ungerboeck trellis with $G2^{B_uL_u}$ states may be used in the decoding/encoding process. A feedback encoder 620 may then be used to encode the quantized bit representation of the channel state information with any suitable channel coding technique, including uncoded modulations.

Feedback information decoder 610 includes a feedback decoder 625 to decode the received feedback information to produce a received version of quantized bit representation, the channel state information, and a trellis encoder 630 to convert the received version of the quantized bit representation of the channel state information to a received version of the channel state information ($\hat{w}=(\hat{w}_{M-L_U+1}, \ldots, \hat{w}_M), \ldots, (\hat{w}_1, \ldots, \hat{w}_{L_1})$), wherein the received version of the channel state information may differ from the channel state information due to interactions with the feedback channel. Quasi-tail-biting trellis encoding uses the received bit-representation and feeds it into the trellis encoder, which generates $L_u$ output entries at a time, such as ($\hat{w}_{M-L_U+1}, \ldots, \hat{w}_M$), followed sequentially by a second group of $L_u$ entries, such as ($\hat{w}_{M-L_{U-1}L_U+1}, \ldots \hat{w}_{M-L_U}$), and so on.

Figure 6B:
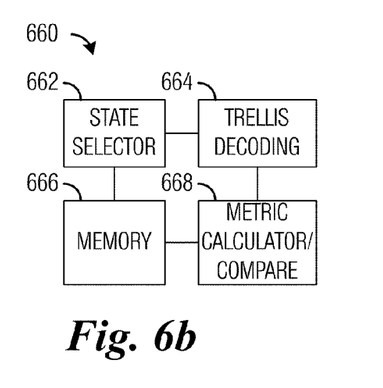
FIG. 6b is a diagram of a detailed view of a trellis decoder.

FIG. 6b illustrates a detailed view of a trellis decoder 660. Trellis decoder 660 may be an implementation of trellis decoder 615. Trellis decoder 660 includes a state selector 662 that may be used to select a starting state for trellis decoding. For example, state selector 662 may be used to select a starting state for each of the G stages of trellis decoding performed by trellis decoder 660, with each starting state being one of the one or more states in a single group of states. Trellis decoder 660 also includes trellis decoding unit 664 coupled to state selector 662. Trellis decoding unit 664 may implement a trellis decoding algorithm, such as Viterbi decoding.

Also coupled to state selector 662 may be a memory 666. Memory 666 may be used to store the channel state information to be converted, as well as a quasi-tail-biting trellis to be used in trellis decoding. Additionally, memory 666 may be used to store the outputs of the quasi-tail-biting trellis (a $B_uL_u$-bit representation of a path through the quasi-tail-biting trellis stage) as each group of $L_u$ dimensions (where $u=1, \ldots, U$) of the channel state information are provided to the quasi-tail-biting trellis. A metric calculator/compare unit 668 may be used to calculate a metric that may be used to select which of the G quantized bit representations of the channel state information is actually the best representation of the channel state information.

Figure 6C:
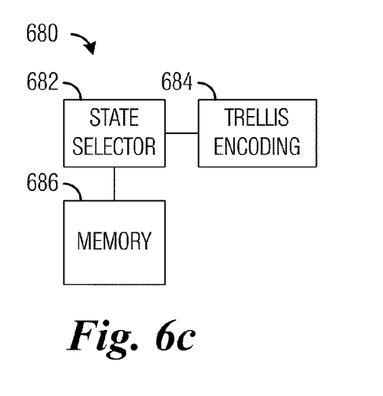
FIG. 6c is a diagram of a detailed view of a trellis encoder.

FIG. 6c illustrates a detailed view of a trellis encoder 680. Trellis encoder 680 may be an implementation of trellis encoder 630. Trellis encoder 680 includes a state selector 682 that may be used to select a starting state for trellis encoding. State selector 682 may select the starting state by selecting a last ($L_UB_U+L_{U-1}B_{U-1}+ \ldots +L_{U-G+1}B_{U-G+1}$) quantized bits of the quantized bit representation of the channel state information and applying the selected ($L_UB_U+L_{U-1}B_{U-1}+ \ldots + L_{U-G+1}B_{U-G+1}$) quantized bits to a trellis encoding unit 684. Trellis encoding unit 684, coupled to state selector 682, may implement a trellis encoding algorithm, such as Viterbi encoding. Trellis encoder 680 also includes a memory 686, which may be used to store the received feedback information, the decoded feedback information, the selected ($L_UB_U+L_{U-1}B_{U-1}+ \ldots +L_{U-G+1}B_{U-G+1}$) quantized bits, the reconstructed channel state information, and so forth.

Figure 7A:
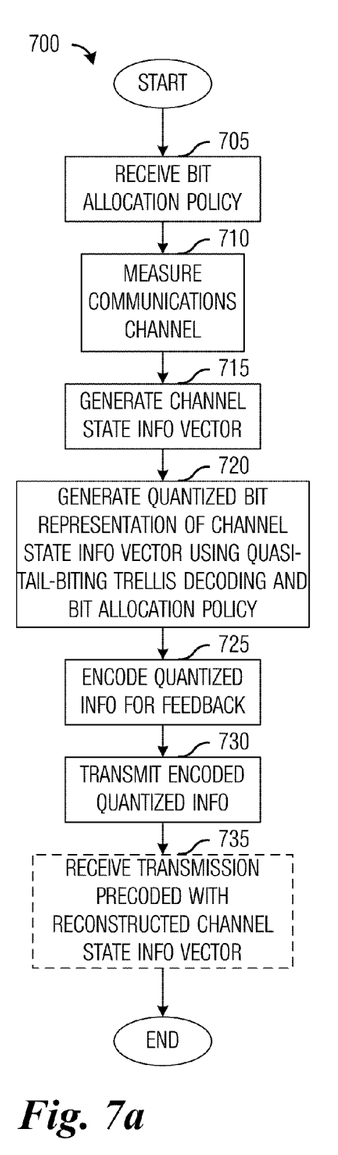
FIG. 7a is a flow diagram of MS operations in providing channel state information to a BS.

FIG. 7a illustrates a flow diagram of MS operations 700 in providing channel state information to a BS. MS operations 700 may be indicative of operations occurring in a MS, such as MS 105, as it provides channel state information to a BS, such as BS 101. MS operations 700 may occur periodically at specified times or it may occur upon an occurrence of an event, such as when an error rate reaches a specified threshold, a data throughput rate drops to a specified threshold, or so forth. MS operations 700 may continue while the MS is in a normal operating mode.

MS operations 700 may begin with the MS receiving a bit-allocation policy (or a bit-allocation profile) from the BS (block 705). The bit-allocation policy may specify a bit allocation for the quantization of a channel state information vector to be provided by the MS. The MS may make use of the bit-allocation policy when it quantizes the channel state information vector.

The MS may then continue by measuring a communications channel (block 710). The communications channel may be between the MS and the BS serving the MS. Alternatively, the communications channel may be a joint communications channel between the MS and one or more BS serving the MS and/or one or more RN serving the MS. When the MS is served by more than one BS or RN, the MS may individually measure the separate communications channels and then combine the measurements together. The communications channel may be measured by measuring a pilot sequence, a reference sequence, or other transmissions made by the BS. The measurements may be made over a short period of time or averaged over an extended period of time.

After measuring the communications channel, the MS may generate a channel state information vector from the measurements of the communications channel (block 715). The MS may also normalize the channel state information vector. The MS may then use quasi-tail-biting trellis decoding and the bit-allocation policy to generate a quantized bit representation of the channel state information vector (or the normalized channel state information vector (block 720). As discussed previously, quasi-tail-biting trellis decoding may process groups of $L_u$ entries of the channel state information vector at a time to produce $B_uL_u$ bits of output per group of $L_u$ entries of the channel state information vector for each power group u, where $u=1, \ldots, U$. A detailed description of the quasi-tail-biting trellis decoding is provided below.

The multiple $B_uL_u$ bits of output combined into a BM bit output, representing the quantized bit representation of the channel state information vector may then be encoded (block 725) by a feedback encoder and transmitted to the BS (block 730). The BS may decode the feedback information to reconstruct a received channel state information vector (an estimate of the channel state information vector produced in block 715) for use in transmitting information to the MS. The MS may optionally receive a transmission that is precoded or beamformed using the received channel state information vector (block 735) and MS operations 700 may then terminate.

Figure 7B:
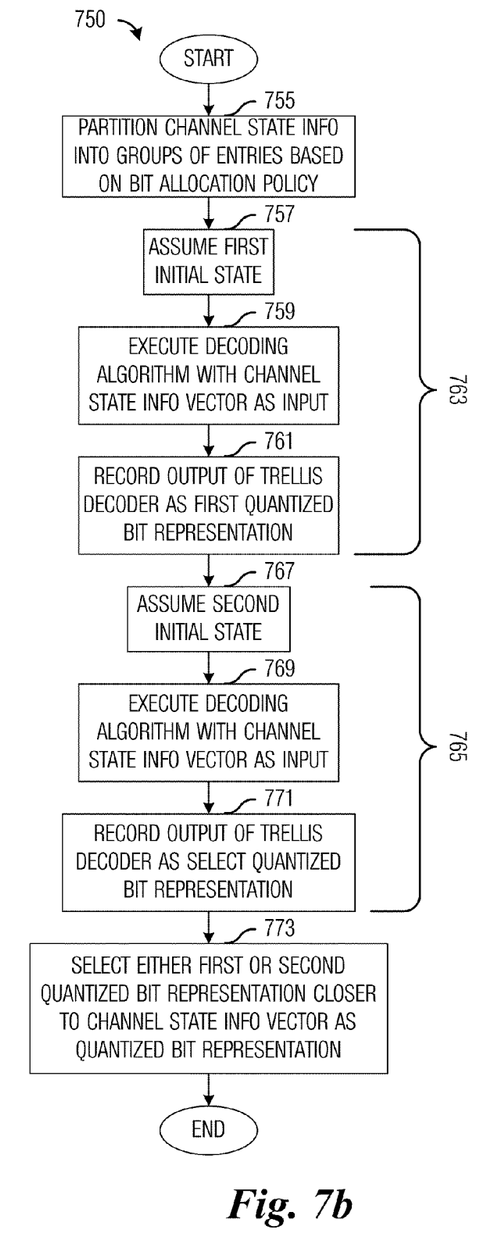
FIG. 7b is a flow diagram of MS operations in quasi-tail-biting trellis decoding to generate a quantized bit representation of the channel state information vector.

FIG. 7b illustrates a flow diagram of MS operations 750 in quasi-tail-biting trellis decoding to generate a quantized bit representation of the channel state information vector. MS operations 750 may be indicative of operations occurring in a MS as the MS generates feedback information for a communications channel to feedback to its controlling BS, RN, or both. MS operations 750 may be an implementation of block 720 of FIG. 7a, generating quantized bit representation of channel state information vector. MS operations 750 may occur periodically or upon an occurrence of an event while the MS is in a normal operating mode.

MS operations 750 may begin with the MS partitioning the channel state information vector $\vec{w}$ into groups of $L_u$ entries for a power group u, where $u=1, \ldots, U$ (block 755). According to an embodiment, the channel state information vector $\vec{w}$ for power group u is $M_u$ entries long and $M_u$ is divisible by $L_u$. Each of the $M_u/L_u$ groups of $L_u$ entries may be an input to a stage of a quasi-tail-biting trellis used in quasi-tail-biting trellis decoding. A first initial state may be selected (block 757). As discussed previously, all starting states of the same group, where the group has the same remainder when divided by G, are equivalent. Therefore, any state of a particular group may be selected as the first initial state. According to an embodiment, a first state of a group is selected as the first initial state. For example, in a quasi-tail-biting trellis with two groups (even states and odd states), the first initial state may be state one, i.e., a first state of the odd states. The quasi-tail-biting trellis decoding may then be executed with the groups of $L_u$ entries as input (block 759).

With the first initial state selected, the $M_u/L_u$ groups of $L_u$ entries for power group u, where u=1, ..., U may be provided as input to the quasi-tail-biting trellis. With each group of the $L_u$ entries provided as input to the quasi-tail-biting trellis, a starting state transitions to an ending state of a stage of the quasi-tail-biting trellis and a state transition corresponds to $B_u L_u$ output bits (and $L_u$ input entries) when the decoding finishes. For example, starting at state one of stage one of a quasi-tail-biting trellis, as a first group of $L_u$ entries is provided to the quasi-tail-biting trellis as input, a transition is made to an ending state of stage one (and a starting state of stage two) with the state transition corresponding to the first $B_u L_u$ bits of final output (and also corresponding to the first group of $L_u$ input entries).

Then, as a second group of $L_{u-1}$ entries is provided to the quasi-tail-biting trellis as input, a transition is made to an ending state of stage two (and a starting state of stage three) with the state transition corresponding to the $B_{u-1} L_{u-1}$ bit outputs after the decoder terminates. A combination of all outputs (a BM bit output) may be recorded as a first quantized bit representation of the channel state information vector (block 761). Blocks 757, 759, and 761 may collectively be referred to as a first stage of the quasi-tail-biting trellis decoding 763.

With first stage of the quasi-tail-biting trellis decoding 763 complete, a second stage of quasi-tail-biting trellis decoding 765 may commence. Second stage of quasi-tail-biting trellis decoding 765 may begin with a selection of a second initial state (block 767). Similar to the selection of the first initial state, the selection of the second initial state may involve the selection of any state within a single group of states. For example, in a quasi-tail-biting trellis with two groups (even states and odd states), if the first initial state was an odd state, then the second initial state may be state two, i.e., a first state of the even states. The quasi-tail-biting trellis decoding may then be executed with the groups of $L_u$ entries as input for power group u, where u=1, ..., U (block 769).

With the second initial state selected, the $M_u/L_u$ groups of $L_u$ entries for power group u may be provided as input to the quasi-tail-biting trellis. With each group of the $L_u$ entries provided as input to the quasi-tail-biting trellis, a starting state transitions to an ending state of a stage of the quasi-tail-biting trellis and produces a $B_u L_u$ bit output that may correspond to the group of $L_u$ entries provided as input. For example, starting at state one of stage one of a quasi-tail-biting trellis, as a first group of $L_u$ entries is provided to the quasi-tail-biting trellis as input, a transition is made to an ending state of stage one (and a starting state of stage two) with the state transition corresponding to the first $B_u L_u$ bit of final output (and also corresponding to the first group of $L_u$ input entries).

Then, as a second group of $L_{u-1}$ entries is provided to the quasi-tail-biting trellis as input, a transition is made to an ending state of stage two (and a starting state of stage three) with the state transition corresponding to the $B_{u-1} L_{u-1}$ bit outputs after the decoder terminates. A combination of all outputs (a BM bit output) may be recorded as a second quantized bit representation of the channel state information vector (block 771).

After second stage of quasi-tail-biting trellis decoding 765 completes, the two BM bit outputs from each stage (the first quantized bit representation of the channel state information vector and the second quantized bit representation of the channel state information vector) may be selected by evaluating a metric, with a selected quantized bit representation of the channel state information vector being either the first or the second quantized bit representation of the channel state information vector that is closer to the channel state information vector (block 773).

According to an embodiment, the metric used to select either the first or the second quantized bit representation of the channel state information vector may be a chordal distance metric, a Euclidean distance, or so on. If the metrics are equal, then either the first or the second quantized bit representation may be randomly selected. The quasi-tail-biting trellis decoding may have a computational complexity of $$O\left(G \sum_{u=1...U} M_u 2^{2 B_u L_u}\right).$$

With the quantized bit representation of the channel state information vector selected, MS operations 750 may then terminate.

Although the discussion of quasi-tail-biting trellis decoding focuses on a two-stage algorithm that selects starting positions from two different groups of starting states (i.e., G=2), quasi-tail-biting trellis decoding may be applicable to any number of different groups G, such as two, three, four, five, and so forth. In a general case with the number of groups G not equal to two, the states in the quasi-tail-biting trellis may be divided into G groups and quasi-tail-biting trellis decoding may occur as a G-stage algorithm. Each stage of the G-stage algorithm may entail the selection of a state within a single group as an initial state, executing the quasi-tail-biting trellis decoding algorithm with the $M_u/L_u$ groups of $L_u$ entries for power group u starting at the initial state, and then saving the BM quantized bit representation of the channel state information vector. The quasi-tail-biting trellis algorithm may then compare the G different BM bit outputs to select one as the bit representation of the channel state information vector. With G different groups, quasi-tail-biting trellis decoding may have a computational complexity of $$O\left(G \sum_{u=1...U} M_u 2^{2 B_u L_u}\right).$$

Therefore, the discussion of two-stages, two groups (even and odd), and so forth, should not be construed as being limiting to either the scope or the spirit of the embodiments.

Figure 8A:
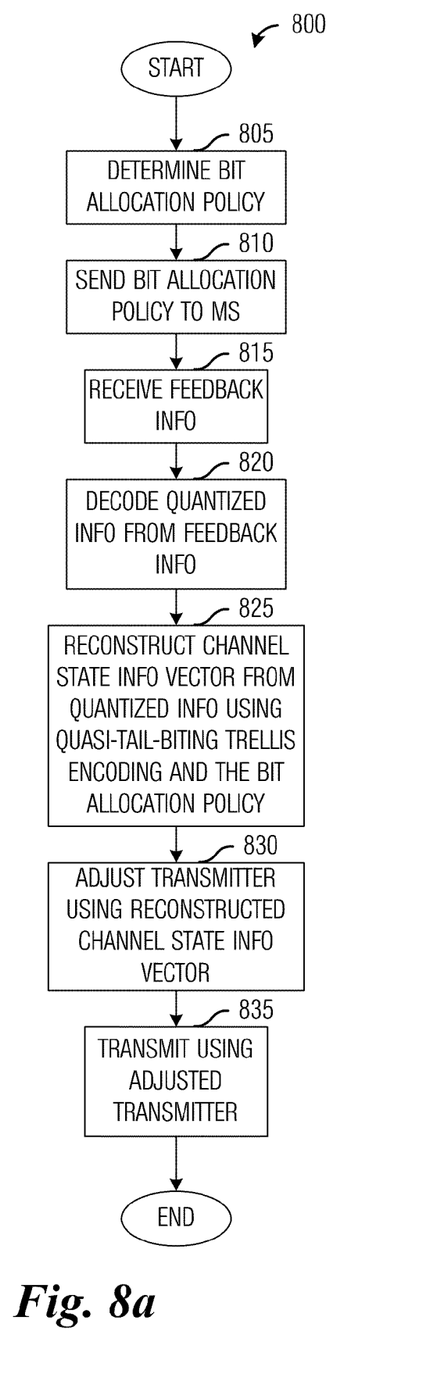
FIG. 8a is a flow diagram of BS operations in transmitting information to a MS.

FIG. 8a illustrates a flow diagram of BS operations 800 in transmitting information to a MS. BS operations 800 may be indicative of operations occurring in a BS, such as BS 101, as it transmits information to a MS, such as MS 105, using channel state information provided by the MS to precode the transmission. BS operations 800 may occur periodically, whenever the BS has a transmission to make, or upon an occurrence of an event, such as when an error rate reaches a specified threshold, a data throughput rate drops to a specified threshold, or so on. BS operations 800 may continue while the BS is in a normal operating mode.

BS operations 800 may begin with the BS determining a bit-allocation policy (or a bit allocation profile) based on feedback information provided by either the MS, position information from network infrastructure, or so on (block 805). The BS may have initiated the determining of the bit-allocation policy by sending a message to the MS requesting that the MS provide the feedback information. The determination of the bit-allocation policy may be a regularly scheduled event or it may be triggered by an occurrence of an event, such as when a data rate falls below a threshold, an error rate (such as bit-error rate, frame-error rate, packet-error rate, or so forth) exceeds a threshold, a quality of service restriction is no longer being met, or so forth. With the bit-allocation policy determined, the BS may share the bit-allocation policy with the MS (block 810).

BS operations 800 may then continue with the BS receiving feedback information from the MS (block 815). Depending on channel conditions, the feedback information may or may not be encoded. If the feedback information is encoded, the BS may decode the feedback information (block 820).

From the feedback information or the decoded feedback information, the BS may reconstruct an estimate of a channel state information vector transmitted by the MS (block 825). The estimate of the channel state information vector may be the channel state information vector as transmitted by the MS with any interaction with the feedback channel. According to an embodiment, the BS may reconstruct the estimate of the channel state information vector using quasi-tail-biting trellis encoding. The BS may make use of the bit-allocation policy in its reconstruction of the estimate of the channel state information vector. Quasi-tail-biting trellis encoding is discussed in greater detail below.

Using the reconstructed estimate of the channel state information vector, the BS may adjust its transmitter (block 830). Adjusting its transmitter may involve selecting a precoding or beamforming vector or matrix depending upon the dimension of the reconstructed estimate of the channel state information vector. The BS may then make use of its adjusted transmitter when it has information to transmit to the MS (block 835). According to an embodiment, the BS may serve a plurality of MSs and the BS may need to adjust its transmitter prior to transmitting to each of the MSs based on a reconstructed estimate of the channel state information vector associated for each MS. After transmitting information to the MS, BS operations 800 may then terminate.

Figure 8B:
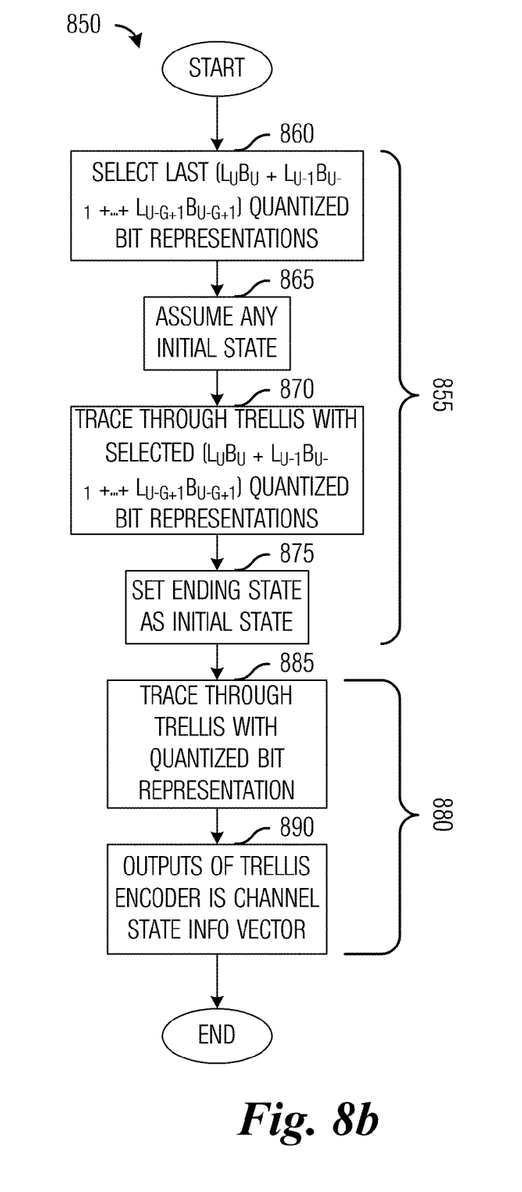
FIG. 8b is a flow diagram of BS operations in quasi-tail-biting trellis encoding to reconstruct an estimate of a channel state information vector.

FIG. 8b illustrates a flow diagram of BS operations 850 in quasi-tail-biting trellis encoding to reconstruct an estimate of a channel state information vector. BS operations 850 may be indicative of operations occurring in a BS, such as BS 101, as the BS reconstructs the estimate of the channel state information vector using quasi-tail-biting trellis decoding on a quantized bit representation of a channel state information vector. BS operations 850 may be an implementation of block 825 of FIG. 8a. BS operations 850 may occur periodically or upon an occurrence of an event while the BS is in a normal operating mode.

BS operations 850 may begin after the BS has received and decoded a quantized bit representation of the channel state information vector from the MS and may be a multi-stage process. A first stage may entail the BS determining a starting state for quasi-tail-biting trellis encoding 855. To determine the starting state, the BS may select the last $(L_U B_U + L_{U-1} B_{U-1} + \ldots + L_{U-G+1} B_{U-G+1})$ quantized bits of the quantized bit representation of the channel state information vector, corresponding to the last G trellis stages (block 860). For example, if G=two and there are only odd and even groups of states, then the BS may select the last $(L_U B_U + L_{U-1} B_{U-1})$ bits. The BS may then select any starting state from the beginning stage of the last G transitions of its quasi-tail-biting trellis (block 865) and apply the selected $(L_U B_U + L_{U-1} B_{U-1})$ bits as input (block 870). As the quasi-tail-biting trellis transitions from the selected starting state to an ending state based on the selected $(L_U B_U + L_{U-1} B_{U-1})$ bits, any output produced may be ignored. The ending state of the quasi-tail-biting trellis may then be selected. The initial state for quasi-tail-biting trellis encoding (block 875) may be any state from the initial state that has the same remainder when dividing the state number by G, assuming that states of a stage are numbered sequentially.

A second stage may entail the BS encoding the quantized bit representation of the channel state information vector to reconstruct the estimate of the channel state information vector 880. The encoding of the quantized bit representation of the channel state information vector may begin with the BS applying $B_u L_u$ bits of the quantized bit representation of the channel state information vector for power group u, where u=1, . . . , U, and transitioning from a starting state of a stage to an ending state of the stage for each of the $B_u L_u$ bits (block 885). As each of the $B_u L_u$ bits is provided as input, a $L_u$-entry output is produced per trellis stage. The $L_u$-entry outputs may be saved as the reconstructed estimate of the channel state information vector (block 890). The $L_u$-entry outputs may need to be reordered to properly reconstruct the estimate of the channel state information vector and BS operations 850 may then terminate.

Figure 9:
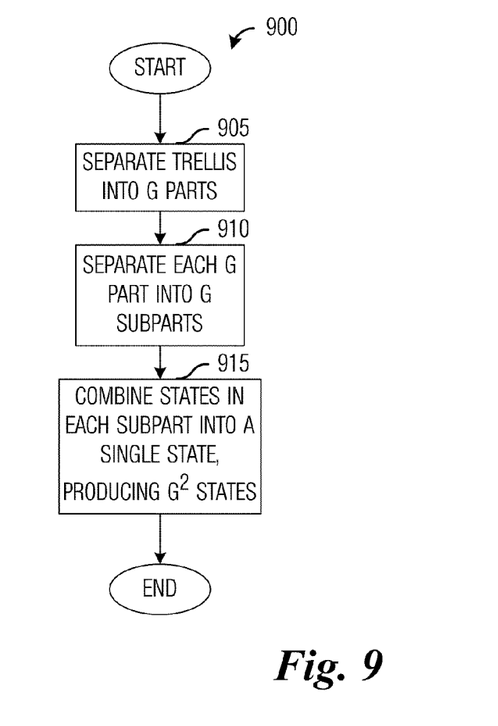
FIG. 9 is a flow diagram of operations in generating a quasi-tail-biting trellis with a constant number of states for a given G.

FIG. 9 illustrates a flow diagram of operations 900 in generating a quasi-tail-biting trellis with a constant number of states for a given G. Operations 900 may be indicative of operations occurring in a BS or a controller responsible for creating a quasi-tail-biting trellis for use in quasi-tail-biting trellis decoding and encoding with non-uniform bit allocation for quantization of channel state information.

In general, to determine how states are coalesced, if a total number of states is $G2^{B_u L_u}$, a desired number of states is $G^2$, then every $2^{B_u L_u}/G$ states may be coalesced into a single state (recall that $2^{B_u L_u}$ is divisible by G). Then, separate all the states into groups of $2^{B_u L_u}$ states (states 1 to $2^{B_u L_u}$, $2^{B_u L_u}+1$ to $2^{B_u L_u+1}$, and so on). Within these groups, coalesce all states having the same remainder when divided by G into a single state. For example, with G=2, $B_u L_u$=2, there are a total of eight states that may be grouped into two groups of $2^{B_u L_u}$ (states 1, 2, 3, 4; and states 5, 6, 7, 8). Then within group of states 1, 2, 3, 4, 1 modulo G=3 modulo G and 2 modulo G=4 modulo G, hence states 1 and 3 are coalesced into a single state and states 2 and 4 are coalesced into a single state, and so forth.

Operations 900 may begin with selecting a trellis, such as an Ungerboeck trellis, with a sufficient number of states per stage to meet parameter, i.e., G, L, B, M, and so forth, requirements. Each stage of the trellis may then be separated into G parts (block 905). For example, if a stage of the trellis has 32 states and G=4, then the stage may be separated into four parts with eight states per part. Then, each part of the trellis stage may then be separated again into G subparts (block 910). Once again, referring to the example of the trellis with 32 states per stage discussed above. Each of the four parts may then be separated into four subparts with two states per subpart. If the subparts contain more than one state, the states with the same remainder when divided by G may be coalesced into a single state (block 915) and operations 900 may then terminate.

Although the embodiments and their advantages have been described in detail, it should be understood that various changes, substitutions and alterations can be made herein without departing from the spirit and scope of the invention as defined by the appended claims Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications node operation, the method comprising:
   receiving a bit-allocation policy for use in quantizing channel state information;
   measuring a communications channel between the communications node and a controller;
   generating channel state information based on the measurement;
   computing a bit representation of the channel state information, wherein the computing makes use of quasi-tail-biting trellis decoding, and wherein the computing is based on the bit-allocation policy;
   transmitting the bit representation to the controller; and
   receiving a transmission from the controller, wherein the transmission makes use of the channel state information transmitted by the communications node.

2. The method of claim 1, wherein computing a bit representation comprises:
   selecting a first initial state of a quasi-tail-biting trellis, wherein the first initial state is a state in a set of first states of the quasi-tail-biting trellis;
   providing the channel state information to the quasi-tail-biting trellis;
   recording outputs of the quasi-tail-biting trellis as a first quantized bit representation of the channel state information;
   selecting a second initial state of the quasi-tail-biting trellis, wherein the second initial state is a state in a set of second states of the quasi-tail-biting trellis;
   providing the channel state information to the quasi-tail-biting trellis;
   recording outputs of the quasi-tail-biting trellis as a second quantized bit representation of the channel state information; and
   selecting either the first quantized bit representation or the second quantized bit representation as the bit representation.

3. The method of claim 1, wherein there are U power groups, and wherein the channel state information comprises an M dimensional vector with complex elements, and wherein computing a bit representation further comprises partitioning the channel state information into $M_u/L_u$ groups of $B_u L_u$ bits for each power group u, where $u=1, \ldots, U$, M is an integer value and the dimension of the channel state information, $L_u$ is an integer value, $M_u$ is divisible by $L_u$, $M_u$ is the dimension of the channel state information allocated for power group u, $M_1 + \ldots + M_u = M$, and $L_u$ is number of dimensions to be quantized in a stage for power group u.

4. The method of claim 3, wherein providing the channel state information comprises providing a group of $L_u$ dimensions of the channel state information for power group u at a time.

5. The method of claim 4, wherein providing a group of $L_u$ dimensions of the channel state information for power group u results in a $B_u L_u$ bit output, where $B_u$ is an integer value representing a number of bits per dimension available to quantize the channel state information for power group u, and wherein the bit-allocation policy specifies $B_u$.

6. The method of claim 2, wherein selecting either the first quantized bit representation or the second quantized bit representation comprises:
   computing a first metric based on the first quantized bit representation and the channel state information;
   computing a second metric based on the second quantized bit representation and the channel state information;
   selecting the first quantized bit representation if the first metric is better than the second metric; and
   selecting the second quantized bit representation if the second metric is better than the first metric.

7. The method of claim 6, wherein selecting either the first quantized bit representation or the second quantized bit representation further comprises randomly selecting the first quantized bit representation or the second bit representation if the first metric is equal to the second metric.

8. The method of claim 6, wherein the first metric and the second metric are chordal distance metrics, Euclidean distance metrics, or a combination thereof.

9. The method of claim 1 further comprising prior to transmitting the bit representation, encoding the bit representation.

10. A method for communications node operation, wherein the communications node is served by a plurality of controllers, the method comprising:
    receiving a bit-allocation policy for use in quantizing channel state information;
    measuring a joint communications channel between the communications node and each controller in the plurality of controllers;
    generating channel state information based on the measurement;
    computing a bit representation of the channel state information, wherein the computing makes use of quasi-tail-biting trellis decoding, and wherein the computing is based on the bit-allocation policy;
    transmitting the bit representation to each controller in the plurality of controllers; and
    receiving a transmission from each controller in the plurality of controllers, wherein the transmission makes use of channel state information transmitted by the communications node.

11. The method of claim 10, wherein measuring a joint communications channel comprises:
    separately measuring a communications channel between the communications node and each controller; and
    combining the separate measurements into the measurement.

12. The method of claim 11, wherein separately measuring a communications channel comprises separately measuring a pilot sequence or a reference sequence transmitted by the communications node.

13. The method of claim 10, wherein at least one of the controllers in the plurality of controllers is a relay node.

14. A method for controller operation, the method comprising:
    determining a bit-allocation policy;
    sending the bit-allocation policy to the communications node;
    receiving feedback information from a communications node;
    reconstructing channel state information from the feedback information, wherein the reconstructing makes use of quasi-tail-biting trellis encoding, and wherein the reconstructing is based on the bit-allocation policy;

adjusting a transmitter of the controller based on the reconstructed channel state information; and transmitting information to the communications node using the adjusted transmitter.

15. The method of claim 14, wherein determining a bit-allocation policy comprises:

receiving feedback information from the communications node, wherein the feedback information comprises information related to transmissions to the communications node; and allocating quantization bits to sources of transmissions to the communications node based on the information.

16. The method of claim 15, wherein the information comprises received signal power levels, average received signal power levels, power-delay profile, position information, and combinations thereof.

17. The method of claim 16, wherein the information is average received signal power levels, and wherein allocating quantization bits comprises allocating quantization bits based on ratios of the average received signal power levels.

18. The method of claim 14, wherein reconstructing the channel state information comprises:

selecting an initial state;

setting the initial state as a starting state of a quasi-tail-biting trellis;

applying the feedback information to the quasi-tail-biting trellis;

recording outputs of the quasi-tail-biting trellis as an index to the channel state information; and retrieving the channel state information from a codebook based on the index.

19. The method of claim 18, wherein selecting an initial state comprises:

selecting a last $(L_U B_U + L_{U-1} B_{U-1} + \ldots + L_{U-G+1} B_{U-G+1})$ quantized bits of the feedback information, wherein G is an integer value and is greater than or equal to two and is a number of times a cardinality of the codebook is greater than $2^{BL}$, $2^{BL}$ is divisible by G, U be the number of power groups, with power group u, where $u=1, \ldots, U$, having $M_u$ dimensions and $M_1 + \ldots + M_U = M$, $L_u$ is a number of dimensions to process in a single trellis stage for power group u, where $M_u$ is divisible by $L_u$ and $L_u$ is smaller than or equal to $M_u$ B is the number of bits per dimension available to quantize the channel state information, $B_u$ is a number of bits per dimension reserved for quantizing the dimensions in power group u, $B_1 L_1 + \ldots + B_U L_U = BM$;

randomly selecting a starting state of the quasi-tail-biting trellis;

applying the last $(L_U B_U + L_{U-1} B_{U-1} + \ldots + L_{U-G+1} B_{U-G+1})$ quantized bits to the quasi-tail-biting trellis; and selecting an ending state of the quasi-tail-biting trellis as the initial state.

20. The method of claim 18, wherein the feedback information is provided to the quasi-tail-biting trellis in groups of $B_u L_u$ bits, where $B_u$ is a number of bits per dimension reserved for quantizing the dimensions in power group u, where $u=1, \ldots, U$, U is the number of power groups, and $L_u$ is a number of dimensions to process in a single trellis stage for power group u.

* * * * *